United States Patent Office 3,550,464
Patented Dec. 29, 1970

3,550,464
LAMINATED TRANSMISSION BELT
Sokichi Yagii, 327–47 Osakabe, Yao-shi, Osaka, Japan;
Tetsushi Saito, 15–3 Chiyodadaicho, Kawachinagano-shi, Osaka, Japan; and Takuji Watanabe, 9–21 Karita-cho, Sumiyoshi-ku, Osaka-shi, Osaka, Japan
Filed Mar. 10, 1969, Ser. No. 805,511
Claims priority, application Japan, Mar. 14, 1968, 43/16,701
Int. Cl. F16g 1/04, 1/16, 1/26
U.S. Cl. 74—232                9 Claims

ABSTRACT OF THE DISCLOSURE

An improved laminated transmission belt provided with at least one surface sheet composed of a sheet of textile fibers and a synthetic resin reinforcing the sheet of textile fibers. If water or oil exists on the working surface of the belt, it is quite possible that the surface sheet will absorb the water or oil, due to the fact that some of the fine spaces extend to the surface of the sheet. As to a material for the textile fibers of the surface sheet, wool fiber is preferably used because of its excellent mechanical properties.

---

The present invention relates to an improved transmission belt composed of a base sheet and at least one flexible porous sheet of textile fiber reinforced by an elastic synthetic resin, more particularly an improved transmission belt composed of a base sheet and at least one textile cloth reinforced by an elastic synthetic resin and laminated rigidly upon a working side or both sides of the base sheet. The term "textile cloth" as used herein comprehends felt, non-woven cloth, napped fabric and pile fabric and also a group of textile fibers forming a sheet.

Generally, in the conventional laminated transmission belt composed of a base sheet and at least one surface sheet laminated rigidly upon a working side or both sides of the base sheet, the base sheet has a function to mainly support working tension of the belt while the surface sheet has a function to protect the base sheet together with creating frictional force to transmit a driving force. As to material of these sheets, a cord-fabric, or a canvas or a synthetic resin film etc. is applied for the base sheet while a textile material reinforced by a synthetic resin, or synthetic rubber or the like, polymer material having rubber-like elasticity is applied for the surface sheet.

In case the surface sheet has a very porous structure such as a configuration mainly composed of textile fabric, degradation of the durability of the belt is inevitable, because the abrasion resistance or fatigue durability of the mentioned surface sheet is inferior to the surface material which is sufficiently reinforced by a synthetic resin having rubber-like elasticity.

However, if the surface sheet has a very compact structure such as a material sufficiently reinforced by a synthetic resin having rubber-like elasticity and has a non-porous configuration, and if a bit of oil or water exists on the working surface thereof, the surface sheet has no function to absorb oil or water, so the coefficient of friction of the laminated belt is degraded, thereby, the transmission efficiency of the belt is lowered and the transmission driving power varies because of slip, finally the belt slips out from a driving means.

Further, the peeling of the surface sheet from the base sheet in connection with the durability of the laminated belt must be considered mentioned peeling of the component sheets of the conventional laminated belt still remains an improvement problem.

The principal object of the present invention is to provide an improved laminated transmission belt having sufficient durability and a function to absorb water or oil, eliminating the mentioned problems of the conventional laminated transmission belt.

Further features and advantages of the invention will be apparent from the ensuing description with reference to the accompanying drawings in which the scope of the invention is in no way limited.

Figure 1:
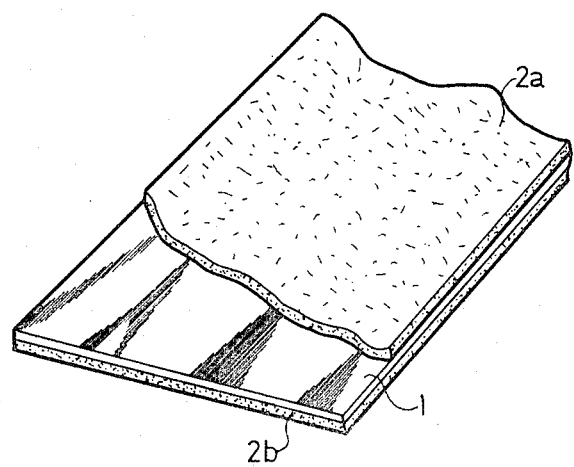
Figure 2:
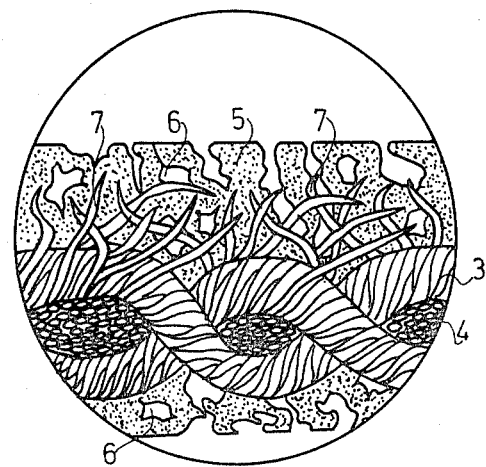
Figure 3:
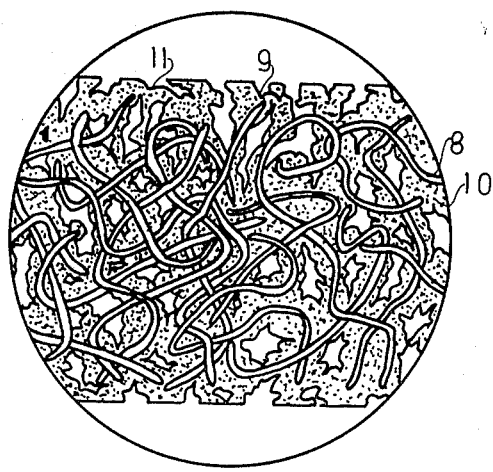
Figure 4:
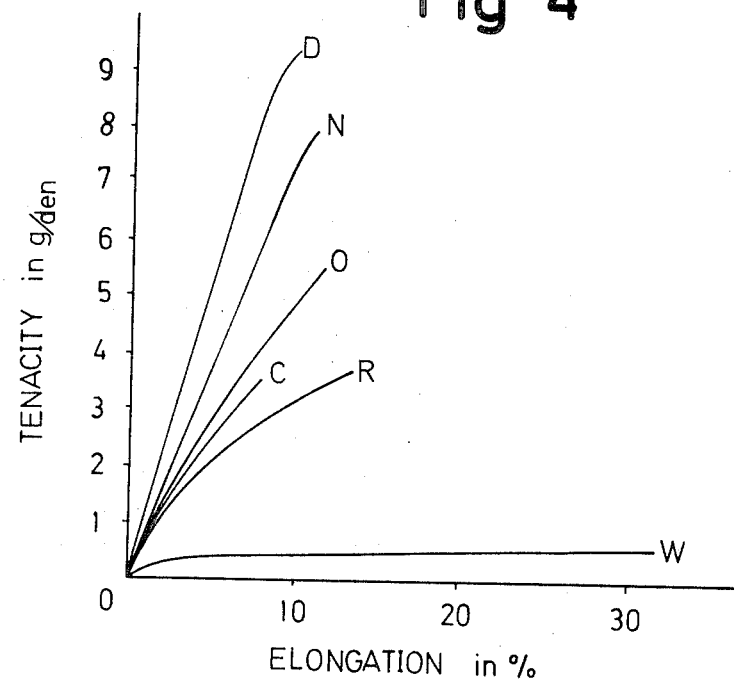

FIG. 1 is a perspective view, partly taken off a surface sheet, of a laminated transmission belt according to the present invention, FIG. 2 is a microscopical explanatory drawing showing a configuration of the surface sheet of the belt shown in FIG. 1, FIG. 3 is a microscopical explanatory drawing showing a configuration of another surface sheet of a modified laminated transmission belt according to the present invention, FIG. 4 is a diagram of tensile test of several textile fibers, showing relation between load and elongation.

Referring to FIG. 1, an embodiment of the laminated belt of the present invention is composed of a base sheet 1 and a pair of surface sheets 2a, 2b rigidly sandwiching the base sheet by a bonding agent. The base sheet 1 is a stretched polyamide resin film having 0.5 mm. thickness and the surface sheets 2a, 2b are napped plain weave cloths having 0.5 mm. thickness which is reinforced by polyurethane resin. As shown in the microscopical drawing of FIG. 2, the surface sheet 2a or 2b has a particular configuration composed of warp yarns 3 and weft yarns 4 of the plain weave cloth and the polyurethane resin 5 reinforcing the cloth numerous fine spaces 6 existing in the sheet. Numerous napped fibers 7 of the cloth and fine spaces 6 exist together with the polyurethane resin 5 in a surface portion of the sheets 2a, 2b. It is easy to make the surface sheet having a surface with numerous fine and very short fibers by buffing. Further, if water or oil exists on the surface, it is quite possible that the sheets 2a or 2b will absorb the water or oil due to the fact that some of the fine spaces 6 extend to the surface of the sheets 2a and 2b. As mentioned above, the laminated transmission belt has a preferable function like that of genuine leather with respect to the function of absorbing water or oil. Further, sufficient strength for the practical use, because of the superior mechanical properties of the polyamide film forming the base sheet 1, is achieved.

By our experimental tests, a cord-fabric, canvas, and other high tenacity synthetic resin films etc. are preferably used as a material for the base sheet, and a felt, non-woven fabric, other napped fabric, pile fabric reinforced by synthetic resin having rubber-like elasticity or synthetic rubber are satisfactorily used as a material for the surface sheet of the invention, as shown in the examples hereinafter illustrated. Further, a mixture composed of the above-mentioned resin and short textile fibers may be used for the surface sheet of the present invention.

EXAMPLE 1

A napped 2/2 twill fabric of nylon spun yarn, having 0.6 mm. thickness is impregnated through with a 25% solution of the polyurethane resin resolved in NN dimethylformamide (hereinafter refers DMF) and excess impregnated solution is removed by passing the impregnated fabric between a pair of squeezing rollers, so that the fabric contains the resin of 200 weight percentage to the weight of the fabric. Next the impregnated fabric is immersed in water to precipitate the impregnant and extract, the DMF, until substantially all the DMF has been removed. The wet impregnated fabric is dried at about 100° C. to remove substantially all water. The dried fabric having roughened surface is subjected to a conventional buffing operation. The percentage of porosity of the final product sheet is about 10%. The mentioned reinforced sheet is used as a pair of surface sheets for a laminated belt of the invention, that is, a stretched polyamide resin film having 0.5 mm. thickness is rigidly sandwiched with the mentioned reinforced sheets by a bonding agent. The laminated transmission belt thus produced, has preferable mechanical properties, for example, dynamic coefficient friction with a cast iron pulley is in a range between 0.5 and 0.8 coefficient of bending elasticity is 1.5 kg./cm.²

It is well-known that the elastic property of the component sheets of the laminated belt is one of very important factors with respect to the durability of the belt, in other words, it is desired that the component sheets of the laminated belt have a high elastic limit and low Young's modulus and superior elastic recovery. By the above-mentioned reason, in the conventional laminated belt, synthetic rubber or synthetic resin having rubber-like elasticity is used as a main material for the belt. At the present time there is no satisfactory material used for the surface sheet with respect to the elastic property. By our experimental tests, wool fiber is one of the excellent material for the present purpose to enhance the durability of the surface sheet. Because wool has excellent plastic properties such as elastic recovery, instant recovery of tensile elongation, and further has a low Young's modulus, high breaking elongation, high bending fatigue resistance which is on the same level as polyamide fiber, high tensile fatigue resistance which is superior than polyamide fiber or other synthetic fibers. Moreover, the rate of loading in the tensile test of wool fiber up to 25% elongation is very low compared with other textile fibers as shown in the load-elongation curves of FIG. 4, wherein wool fiber, polyester fiber, polyamide fiber, acrylic fiber, high tenacity rayor and cotton fiber as designated by "W," "D," "N," "O," "R" and "C" respectively. These data are referred from Ernest R. Kaswell: "Textile fibers yarns and Fabric."

In Table 1 the mechanical properties of several textile materials are comparatively shown.

As it is clearly shown, the worsted fabric is remarkably reinforced by the polyurethane resin.

EXAMPLE 2

A plain weave fabric of 0.8 mm. thickness and 0.37 specific gravity is impregnated through with a 21% solution of the polyurethane resin resolved in DMF, and excess impregnated solution is removed by passing the impregnated fabric between a pair of squeezing rollers. Blended yarn composed of 80% wool and 20% nylon staple fiber is used as warp and filling of the mentioned fabric. Next the impregnated fabric is immersed in water to extract the DMF until all the DMF has been removed. The wet impregnated fabric is dried at about 100° C. to remove substantially all water and the dried fabric is made to flatten the surface and buffed the back side of the treated fabric. The fabric thus produced becomes very flexible sheet. The mentioned sheet is used as a pair of surface sheets rigidly sandwiching a base sheet composed of a plurality of polyester cord yarns having 0.75 mm. by using a bonding agent. The final product of laminated transmission belt has excellent mechanical properties which can be satisfactorily used for power transmission.

EXAMPLE 3

A 2/2 twill weave worsted fabric whose thickness is 1.2 mm. is subjected to a napping operation and a napped fabric having 1.6 mm. thickness and apparent specific gravity of 0.30 is produced. The material of the fabric is 100% wool. The napped fabric is impregnated through with a 26% solution of the polyurethane resin resolved in DMF, and excess impregnated solution is removed by passing the impregnated fabric between a pair of squeezing rollers. Next the impregnated fabric is immersed in water so as to extract all the DMF. The wet impregnated fabric is dried at 90° C. to remove substantially all water, then both sides of the dried fabric is subjected to a conventional buffing operation. The final product is a rein-

TABLE 1

| Mechanical property | Material | | | | | |
| --- | --- | --- | --- | --- | --- | --- |
| | Polyamide filament | Polyacrylic filament | polyester filament | High tenacity rayon filament | Cotton fiber | Wool fiber |
| Tensile strength (g./d.) | 4.5~7.7 | 1.7~3.5 | 4.0~7.0 | 2.4~4.6 | 2.0~5.0 | 1.0~1.7 |
| Breaking elongation (percent) | 25~14 | 40~15 | 30~10 | 20~9 | 7~3 | 35~25 |
| Elastic recovery (percent) (2-8% elongation) | 100~99 | 99~80 | 97~80 | 70~54 | 75~52 | 99~80 |
| Instant recovery of tensile extension (after 5% extension) (percent) | 38 | 18 | 32 | 14 | 16 | 38 |
| Bending fatigue resistance (under tension of 1 g, bending angle 180°) (number of bending) | (1) | | | 950 | 3,400 | (1) |
| Fatigue resistance to repeated extension (3% extension) (number of extension) | (2) | | | 490 | 134 | (3) |

1 More than 40,000.
2 More than 5,000.
3 More than 10,000.

Consequently, it can be understood that wool is one of the preferable textile fibers for attaining purpose of the present invention. As to the material for reinforcing the textile material with respect to the durability, polyurethane resin is preferably used in case of using wool fibers.

Table 2 shows a result of the reinforcement of the worsted fabric by polyurethane resin.

TABLE 2

| | Material | |
| --- | --- | --- |
| Item | Before reinforcement | After reinforcement |
| Thickness of fabric (in mm.) | 1.4 | 1.8 |
| Tensile strength in kg./cm.: | | |
| Warp direction | 15 | 26 |
| Filling direction | 12 | 19 |
| Breaking elongation in percent: | | |
| Warp direction | 45 | 58 |
| Filling direction | 42 | 59 |

Note: Construction of the fabric: plain weave $\frac{6^s \times 6^s}{10 \times 10}$ forced wool sheet having flexibility. The mentioned sheet is used for a pair of surface sheet rigidly laminated to both side of a stretched polyamide resin film having 0.5 mm. thickness.

EXAMPLE 4

A pile fabric composed of a polyester base fabric and a pile structure punched to the base fabric is prepared. A worsted pile yarn is used for producing the mentioned fabric having thickness of 1.0 mm. and an apparent specific gravity of 0.28. The pile fabric is impregnated through with a 21% solution of polyurethane resin resolved in DMF, and excess impregnated solution is removed by passing the fabric between a pair of squeezing rollers. After squeezing the fabric, the DMF is extracted by immersing the fabric in water until all the DMF has been removed. The wet impregnated fabric is dried at about 90° C. The dried fabric is subjected to a conventional buffing operation so as to buff both sides of the fabric. Thus a flexible reinforced sheet is produced. Next the mentioned reinforced sheet is used as a pair of surface sheets rigidly sandwiching a stretched polyamide resin sheet having thickness of 0.5 mm. so that a laminated transmission belt of triple layer having excellent mechanical properties is produced.

EXAMPLE 5

A blend felt composed of 80% wool, 20% rayon staple is prepared. The mentioned felt has 1.5 mm. thickness and 0.35 apparent specific gravity. The felt is impregnated through with a 15% solution of polyurethane resin resolved in DMF and the impregnated fabric is further coated with a 26% solution of polyurethane resin resolved in DMF so that the coating thickness is 0.15 mm. Next, the mentioned coated fabric is immersed into water so as to extract all the DMF. Next, the wet impregnated fabric is dried by heat at 100° C., the dried fabric is subjected to the conventional buffing operation. The final product is a flexible reinforced sheet. The reinforced sheet has a preferable structure as shown in FIG. 3, wherein the felt is composed of wool fibers 8 and a rayon staple 9 reinforced by polyurethane resin 10 having numerous fine spaces 11. Some of the fines spaces 11 extend to the surface of the sheet. The mentioned reinforced sheet is used as a pair of surface sheets rigidly laminated to both sides of a stretched polyamide film having 1.0 mm. thickness. Thus produced laminated transmission belts have excellent mechanical properties.

EXAMPLE 6

Wool fiber is mixed in a rubber paste containing chloroprene rubber in such a rate that weight parts of wool fiber to 100 weight parts of a pure rubber component in the paste is 30. The above-mentioned mixing is carried out by an agitator. Next, a sheet having 2.0 mm. thickness is produced from the mentioned mixture. The sheet is laminated upon to a stretched nylon sheet having 2.0 mm. thickness under low pressure, and the laminated sheets are treated by a vulcanizing press for 40 min. at 130° C., thus a double layer laminated belt having good quality is produced.

EXAMPLE 7

A rubber paste containing chloroprene rubber is coated over a 2/2 twill worsted fabric having thickness of 0.8 mm. After drying the coated paste, the dried coated fabric is vulcanized for one hour at 135° C. so as to produce a vulcanized rubber coated fabric. This vulcanized fabric is used as a pair of surface sheet rigidly laminated to both sides of a base sheet composed of a plurality of high tenacity rayon cords.

By the above-mentioned method for producing the laminated belt, six belts having different thicknesses are produced by changing the coating thickness of the rubber paste. Table 3 shows the mechanical properties of these laminated belts.

TABLE 3

| Belts | Thickness (mm.) | Surface sheet ||||  Bending test of belt: number of bending (×10⁵) |
|---|---|---|---|---|---|---|
| | | Tensile strength (kg./cm.) || Breaking elongation (Percent) || |
| | | Warp direction | Filling direction | Warp direction | Filling direction | |
| Sample: | | | | | | |
| 1 | 1.2 | 15 | 12 | 58 | 55 | (¹) |
| 2 | 2.1 | 16 | 10 | 68 | 63 | (¹) |
| 3 | 1.5 | 36 | 22 | 18 | 12 | 20 |
| 4 | 2.2 | 28 | 26 | 40 | 46 | 16 |
| 5 | 1.8 | 25 | 23 | 78 | 69 | 14 |
| 6 | 1.0 | 19 | 20 | 45 | 34 | 10 |

¹ More than 21.

In Table 3, the bending test is carried out by belting about a pulley having 25 mm. dia. and the number of belt turns is counted at a time of producing a split or peeling off of the surface sheet from the base sheet.

To clarify the preferable quality of the laminated belt using wool, two comparative samples are produced, that is, a cotton napped cloth having a similar construction is used instead of using the worsted fabric in Example 2 and a laminated belt is produced, on the other hand, a non-woven fabric composed of polyamide staple fiber having 1.5 mm. thickness is used instead of the belt in Example 4 and another laminated belt is produced. These belts are referred to by Examples 8 and 9 respectively, in Table 4 which shows comparative data of the mechanical properties of these laminated transmission belt.

TABLE 4

| Belts | Surface sheet ||||  Bending test of belt: number of bending (×10⁵) |
|---|---|---|---|---|---|
| | Tensile strength (kg./cm.) || Breaking elongation (percent) || |
| | Warp direction | Weft direction | Warp direction | Weft direction | |
| Example: | | | | | |
| 3 | 16 | 10 | 68 | 63 | (¹) |
| 8 | 11 | 6 | 23 | 38 | 12 |
| 4 | 23 | 26 | 40 | 46 | (²) |
| 9 | 44 | 49 | 54 | 46 | 1.5 |

¹ More than 21.
² More than 16.

As it is clearly shown in Table 4, the laminated transmission belts using surface sheets containing wool fiber have superior mechanical property compared with the sample belts of Examples 8 and 9.

While the invention has been described in conjunction with certain embodiments thereof it is to be understood that various modifications and changes may be made without departing from the spirit and scope of the invention.

What is claimed is:

1. In a laminated transmission belt composed of a base sheet for mainly supporting tension and at least one surface sheet rigidly laminated to a working side or both sides of said base sheet, an improvement comprising said surface sheet composed of a textile cloth and a synthetic resin having rubber-like elasticity reinforcing binding of textile fibers, of said textile cloth, said synthetic resin including numerous fine spaces, certain of said fine spaces extend to surface thereof.

2. An improved laminated transmission belt according to claim 1, wherein said textile cloth contains more than 50 weight percent of wool.

3. An improved laminated transmission belt according to claim 1, wherein said textile cloth forms a napped fabric.

4. An improved laminated transmission belt according to claim 1, wherein said textile cloth forms a felt like configuration.

5. An improved laminated transmission belt according to claim 1, wherein said textile cloth forms a non-woven cloth.

6. An improved laminated transmission belt according to claim 1, wherein said textile cloth forms a pile fabric.

7. An improved laminated transmission belt according to claim 1, wherein said synthetic resin is polyurethane resin.

8. An improved laminated transmission belt according to claim 1, wherein said base sheet is a stretched polyamide film.

9. An improved laminated transmission belt according to claim 1, wherein said surface layer is subjected to a conventional buffing treatment, thereby said surface of said layer is provided with numerous very fine and short fibers projected therefrom.

References Cited
UNITED STATES PATENTS

| | | | |
|---|---|---|---|
| 64,397 | 5/1867 | Adams | 74—231 |
| 2,983,304 | 5/1961 | Rasero | 74—232 |
| 3,000,771 | 9/1961 | Runton | 74—232 |
| 3,002,536 | 10/1961 | Lord et al. | 74—232 |

JAMES A. WONG, Primary Examiner